(No Model.)

C. H. MANNING.
EYEGLASS CASE.

No. 272,450. Patented Feb. 20, 1883.

WITNESSES

INVENTOR

UNITED STATES PATENT OFFICE.

CHARLES H. MANNING, OF WASHINGTON, DISTRICT OF COLUMBIA.

EYEGLASS-CASE.

SPECIFICATION forming part of Letters Patent No. 272,450, dated February 20, 1883.

Application filed May 4, 1882. (No model.)

*To all whom it may concern:*

Be it known that I, CHAS. H. MANNING, a citizen of the United States, residing at Washington, in the District of Columbia, have invented an Improvement in Eyeglass Cases or Lockets, of which the following is a specification, reference being had to the accompanying drawings, forming part thereof.

Figure 1:
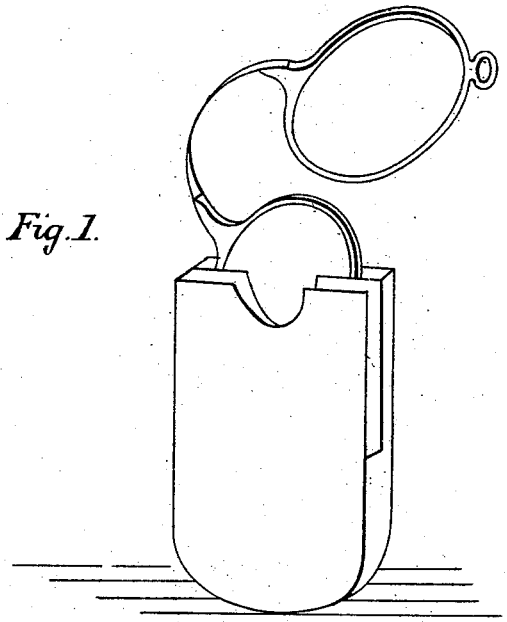
Figure 2:
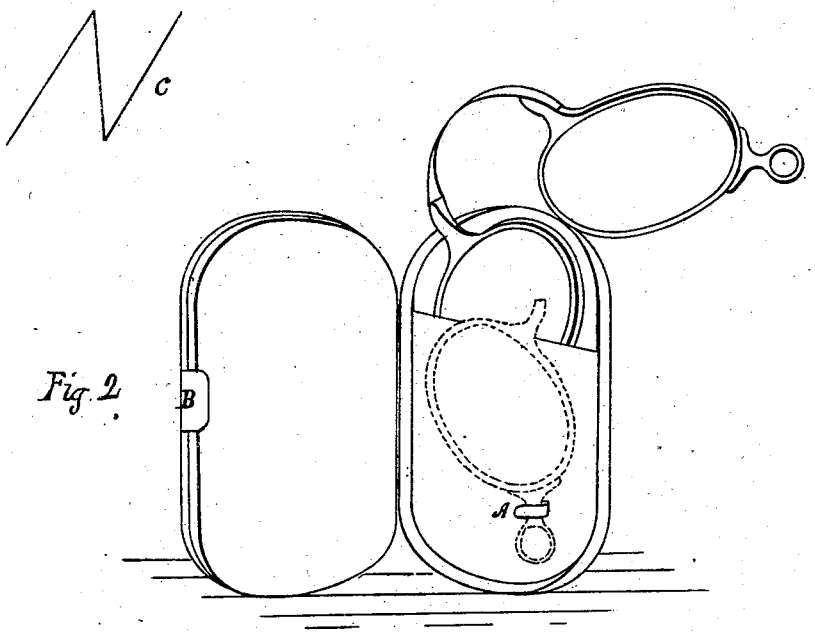

Figure 1 is a side view; Fig. 2, a front view.

Heretofore cases for eyeglasses that shut up have been made in one cell or compartment, and the eyeglass, when folded, liable to injury from friction by the two glasses rubbing together.

My improvement consists in the construction of eyeglass-cases with a partition which divides the case in such manner as forms a receptacle, into which one glass is inserted, and the other slides over and outside the partition or leaf, thus providing a soft leaf or substance between the two glasses to prevent friction. I make these cases, as shown in Fig. 1, with one pocket the entire depth of the case and the other having a portion open or removed at one edge. In this form one of the glasses is partially inserted in the perfect pocket; then the other glass is swung into the other and both are pushed home. I also make them in the form shown in Fig. 2, where, instead of the mutilated pocket, I employ a hook to hold the second glass in position. I also form them double to hold two eyeglasses; or the parts may be utilized to hold tickets or money, &c. I make them of various materials and shapes, and by attaching the leaves to a strip bent in the shape of an N, or the leaves formed in that shape, with a cap or cover.

Fig. 1 in the accompanying drawings represents the eyeglass ready to be slid in, so as to bring the partition or leaf between the two glasses. In Fig. 2 the case is shown with the eyeglass in and held by the hook A.

B is the double-case partition and clasp.

C is the form of the leaves when attached at the sides. I make the cases of various materials and shapes and adornments.

What I claim is—

1. In an eyeglass case or locket, the leaves or partitions arranged to go between the two glasses when folded, for the purpose specified.

2. An eyeglass-case with lids or leaves for one or more eyeglasses, with pockets and hooks to hold the same in position, as shown and described.

3. The above-described eyeglass-case having a pocket for one of the glasses and a hook or mutilated pocket to hold the other in position, the two glasses being kept from contact by one or more leaves, substantially as shown and described.

CHAS. H. MANNING.

Witnesses:
H. B. ZEVELY,
A. N. ZEVELY.